UNITED STATES PATENT OFFICE.

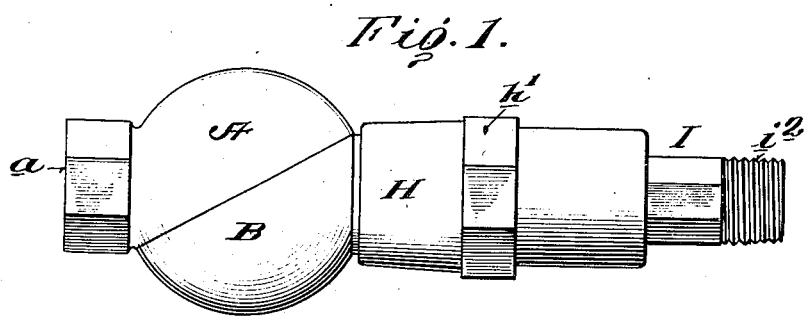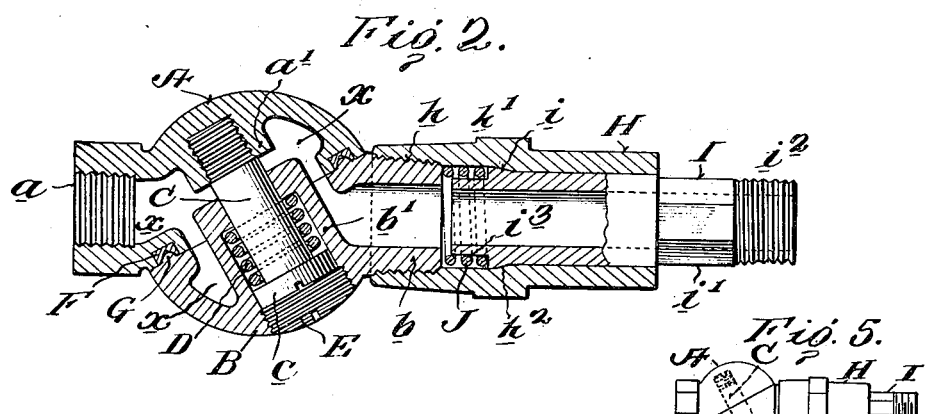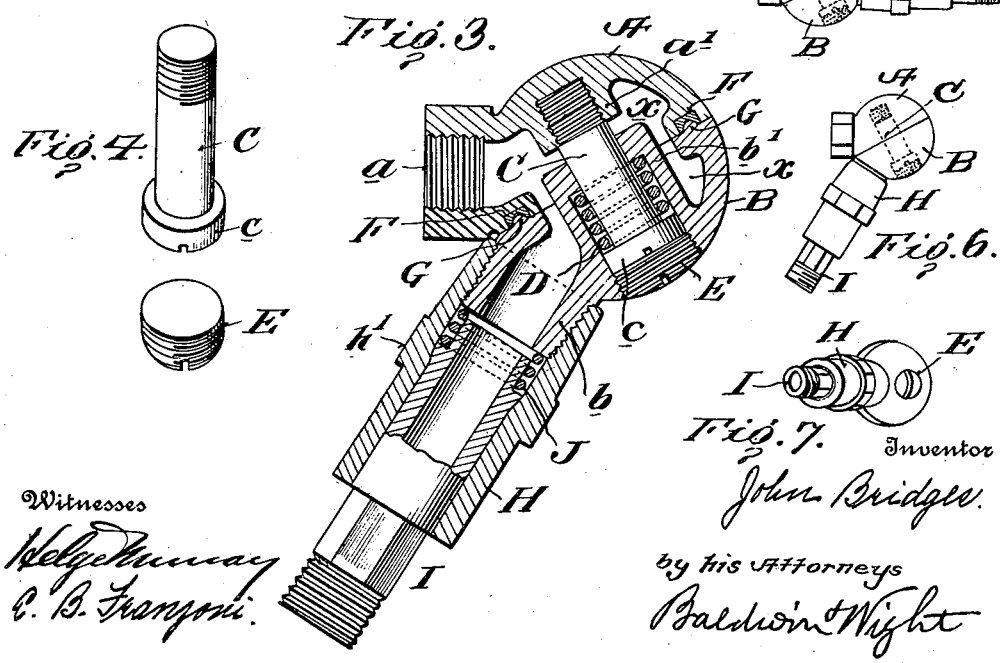

JOHN BRIDGES, OF LOUISVILLE, KENTUCKY, ASSIGNOR TO UNIVERSAL SWING JOINT AND MACHINE COMPANY, OF LOUISVILLE, KENTUCKY, A CORPORATION OF KENTUCKY.

FITTING FOR PIPES AND RODS.

1,123,839.     Specification of Letters Patent.     Patented Jan. 5, 1915.

Application filed November 10, 1913. Serial No. 800,121.

*To all whom it may concern:*

Be it known that I, JOHN BRIDGES, a citizen of the United States, residing at Louisville, in the county of Jefferson and State of Kentucky, have invented certain new and useful Improvements in Fittings for Pipes and Rods, of which the following is a specification.

This invention relates to pipe and rod fittings of the kind shown in U. S. Letters Patent No. 695,022 of Mar. 11, 1902, wherein the joint is made by means of two hemispherical members pivotally connected to move in contact with each other about an axis disposed diagonally to the axes of the pipes or rods to be connected, the two members being provided with means for connecting them with said pipes or rods. By such fittings the pipes or rods may be easily connected and held at any desired angle, within certain limits.

The object of this invention is to improve fittings of the kind shown in said patent in order to give them a wider range of adjustment, to automatically hold them in their adjusted positions, to compensate for wear, to prevent leakage and to automatically relieve excessive and dangerous pressure.

In carrying out my invention, I provide two hemispherical coupling members as heretofore and I connect them by means of a pivot bolt which is firmly secured to one member and yieldingly connected to the other member by means of a spring which surrounds the pivot bolt and draws the two members together with sufficient pressure to prevent leakage under normal conditions, but permits them to open when the pressure is abnormal or dangerous. One member of the coupling is preferably provided with a non-corrodible metallic packing ring with which engages an annular rib on the other member. I also provide one member of the fitting with a sleeve having a threaded engagement with a boss on one member of the coupling, and which receives a pipe section having a beveled shoulder which engages a beveled seat within the sleeve, and between which shoulder and the end of the boss of the adjacent coupling member is interposed a spring which presses the shoulder of the pipe section against the seat in the sleeve.

In the accompanying drawings: Figure 1 shows a side elevation of a fitting for pipes and rods constructed in accordance with my invention. Fig. 2 shows a vertical section thereof. Fig. 3 is a view similar to Fig. 2, but shows one member turned relatively to the other to its full extent. Fig. 4 shows in perspective the pivot bolt employed, together with a combined lock nut and finishing cap. Figs. 5, 6 and 7 are on a reduced scale. Fig. 5 shows the position of the two members when the axes of their coupling projections are in line with each other. Fig. 6 shows the position of the parts when one member is turned to its full extent relatively to the other member, and Fig. 7 shows how the coupling may be turned bodily in order to bring the two coupling parts into the same horizontal or other plane after the desired angle has been reached.

The fitting comprises two members, A, B. When used for coupling rods these members are not necessarily hollow, but when used for connecting pipes they should be chambered, as shown. I have shown the fitting adapted for connecting pipes and will therefore so describe it, although it will be understood that it may be employed for connecting rods, and when used for connecting rods there may not necessarily be a passage through the coupling.

As shown the members A and B are substantially hemispherical, although it is obvious that this exact shape need not be adhered to. The member A is provided with a threaded boss $a$ adapting it to be connected with a pipe or rod. In like manner the member B is provided with a threaded boss $b$ for a similar purpose. In this instance the members A and B are chambered, as indicated at $x$, providing a passage through them for steam, water or other fluid or gas.

The member A is formed with a boss $a'$ having a threaded socket which receives the threaded end of the pivot bolt C. This extends through a hollow boss $b'$ formed in the member B. This boss approaches quite closely the boss $a'$ but never comes in contact therewith. The chamber of the boss $b'$ is open to the outside of the member B, and the head $c$ of the bolt C is received in said recess and is adapted to move therein. The inner end of the boss is provided with an opening just sufficient to receive the bolt C and allow it to move endwise therein freely but without substantial leakage. Between the head $c$ of the bolt and the inner wall of the recess of said boss $b'$ is interposed a spring D, which surrounds the bolt, bears against its head $c$, and tends to move it outward. The head of the bolt is wholly within the recess of the boss, and in order to lock the bolt, i. e., prevent its loosening and to close the recess tightly against leakage and improve the appearance of the joint, I provide a lock nut E which is connected in the threaded outer end of the recess of the boss $b'$, as clearly shown in Fig. 2. The member A carries a ring F of non-corrodible metal. This ring is formed with an annular groove which receives an annular rib G on the member B.

The spring D draws the members tightly together, the joint being made by the ring F and the rib G. This construction allows one member to turn relatively to the other but maintains a tight joint, preventing leakage. As wear takes place, the spring provides sufficient compensation. Furthermore, the spring may be so adjusted as to hold the parts together against all internal pressure up to a predetermined point and when this point is passed the spring may yield to allow the joint to open and thus prevent breakage of any of the parts.

In order to connect the coupling with a pipe I may employ the devices shown at the right hand side of Figs. 1 and 2. The boss $b$ is threaded as shown and is engaged by a sleeve H, which is internally threaded at $h$ to engage the boss $b$. This sleeve is provided with a wrench-receiving part $h'$ and it is formed on the inside with a shoulder $h^2$ which receives the shouldered portion $i$ of a pipe section I, which pipe section is also provided with a wrench-receiving portion $i'$ whereby said section may be held while a pipe is being applied to its threaded portion $i^2$. Between the shoulder $i$ of the section I and the outer end of the boss $b$ is interposed a spring J, which surrounds a reduced portion $i^3$ of the pipe section I. By this arrangement the shoulder $i$ of the section I is held tightly against the shoulder $h^2$ of the sleeve and leakage is prevented. At the same time the pipe section I may be turned to any desired extent and the sleeve H may also be properly adjusted. In this way I provide a fitting for pipes and rods which may be adjusted to hold them at any desired angle relatively to each other within certain limits, and the coupling is made to yield when necessary or when abnormal internal pressures exist to prevent breakage of the parts.

I claim as my invention:—

A pipe fitting comprising two hollow hemispherical members having separable circular bearing surfaces, one of which members is provided with a recessed inwardly extending hollow boss, a pivot bolt extending through said boss and adjustably connected with the opposing member of the fitting, a spring in said boss which engages the pivot bolt and presses it radially outward to yieldingly draw the two members of the fitting together but which permits them to automatically separate when the internal pressure is excessive and to thus establish communication between the interior of the fitting and the atmosphere, said members having within them a pressure chamber with separable opposing walls subject to fluid pressure.

In testimony whereof, I have hereunto subscribed my name.

JOHN BRIDGES.

Witnesses:
  MAY E. BENNETT,
  BURTON S. BROWN.